US012495117B2

(12) United States Patent
Tanaka

(10) Patent No.: US 12,495,117 B2
(45) Date of Patent: Dec. 9, 2025

(54) INFORMATION PROCESSING APPARATUS, INFORMATION PROCESSING SYSTEM, NON-TRANSITORY COMPUTER READABLE MEDIUM STORING INFORMATION PROCESSING PROGRAM, AND INFORMATION PROCESSING METHOD THAT ALLOW USER TO CHECK PRINTED MATTER BEFORE PAYMENT

(71) Applicant: FUJIFILM Business Innovation Corp., Tokyo (JP)

(72) Inventor: Kazunari Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 432 days.

(21) Appl. No.: 17/953,282

(22) Filed: Sep. 26, 2022

(65) Prior Publication Data

US 2023/0308585 A1    Sep. 28, 2023

(30) Foreign Application Priority Data

Mar. 28, 2022   (JP) ................................ 2022-052615

(51) Int. Cl.
   *H04N 1/34*       (2006.01)
(52) U.S. Cl.
   CPC ..... *H04N 1/344* (2013.01); *H04N 2201/0017* (2013.01)

(58) Field of Classification Search
   None
   See application file for complete search history.

(56) References Cited

U.S. PATENT DOCUMENTS

2009/0248632 A1* 10/2009 Subramanian ..... H04N 1/32523
2017/0201647 A1*  7/2017 Neville .............. H04N 1/00344
2017/0243087 A1   8/2017 Awatsu

FOREIGN PATENT DOCUMENTS

| JP | 2003140875 | 5/2003 |
| JP | 2009070221 | 4/2009 |
| JP | 2017146827 | 8/2017 |

* cited by examiner

*Primary Examiner* — Lennin R Rodriguezgonzalez
(74) *Attorney, Agent, or Firm* — JCIPRNET

(57) ABSTRACT

An information processing apparatus includes a processor configured to receive print data and designation of a facility selected by a user from a user terminal operated by the user, transmit the print data to an apparatus that is installed in the designated facility, transmit receipt information, which is information that enables reception of a printed matter related to the print data, to the user terminal, and charge the user for the printed matter in a case in which the user who has entered the facility receives the printed matter using the receipt information and leaves the facility.

15 Claims, 8 Drawing Sheets

INFORMATION PROCESSING APPARATUS, INFORMATION PROCESSING SYSTEM, NON-TRANSITORY COMPUTER READABLE MEDIUM STORING INFORMATION PROCESSING PROGRAM, AND INFORMATION PROCESSING METHOD THAT ALLOW USER TO CHECK PRINTED MATTER BEFORE PAYMENT

CROSS-REFERENCE TO RELATED APPLICATIONS

This application is based on and claims priority under 35 USC 119 from Japanese Patent Application No. 2022-052615 filed Mar. 28, 2022.

BACKGROUND

(i) Technical Field

The present invention relates to an information processing apparatus, an information processing system, a non-transitory computer readable medium storing an information processing program, and an information processing method.

(ii) Related Art

JP2017-146827A discloses a printed matter confirmation apparatus including a main body unit that acquires a printed matter, on which an image has been printed by an image forming apparatus, from the image forming apparatus and a visual unit that enables the user to visually check an image of the printed matter in a state in which the printed matter accommodated in the main body unit is not taken out.

JP2003-140875A discloses a printing system that includes at least one output terminal. The output terminal sets customer's print information input via a network as predetermined print data based on information input to an image input apparatus of an output terminal that is provided in a store and outputs the predetermined print data in a predetermined print form from an image forming apparatus of the output terminal in the store.

JP2009-070221A discloses a portable apparatus including a communication unit that performs wireless communication with an image processing apparatus, a first receiving unit that receives information indicating that printing is being performed from the image processing apparatus, a second receiving unit that receives information indicating that printing has been completed from the image processing apparatus, and an output unit that outputs a message indicating that a printed matter output by the image processing apparatus has been forgotten in a case in which a connection status of the wireless communication with the image processing apparatus or a distance to the image processing apparatus satisfies a predetermined condition after the information indicating that printing is being performed is received from the image processing apparatus and before the information indicating that printing has been completed is received from the image processing apparatus.

SUMMARY

In recent years, in sales of stores, such as convenience stores, in some cases, a walk-through payment system that does not require registration and payment by a cash register has been introduced. The walk-through payment system is a technique that tracks a user registered in advance and an item put in a shopping cart, using a camera or the like, registers the item as a purchased item, and performs charging and payment to improve user convenience at a store.

However, there is a system in which print data and a print instruction are transmitted in advance to a multifunction machine installed in a store via a network and printing is completed at a time when a user visits the store such that the user can receive a printed matter immediately. The system detects that the user has received the printed matter and charges the user, which makes it possible for the user to make a payment without operating the multifunction machine in a case in which the user visits the store.

However, for example, even though there is a problem with the multifunction machine and a normal printed matter is not obtained, the user is charged in a case in which the user receives the printed matter. That is, the user has no grace period to check the printed matter and is charged.

Aspects of non-limiting embodiments of the present disclosure relate to an information processing apparatus, an information processing system, a non-transitory computer readable medium storing an information processing program, and an information processing method that can give a user a grace period to check a printed matter after the user receives the printed matter and then charge the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to receive print data and designation of a facility selected by a user from a user terminal operated by the user, transmit the print data to an apparatus that is installed in the designated facility, transmit receipt information, which is information that enables reception of a printed matter related to the print data, to the user terminal, and charge the user for the printed matter in a case in which the user who has entered the facility receives the printed matter using the receipt information and leaves the facility.

BRIEF DESCRIPTION OF THE DRAWINGS

Exemplary embodiment(s) of the present invention will be described in detail based on the following figures, wherein.

DETAILED DESCRIPTION

Figure 1:
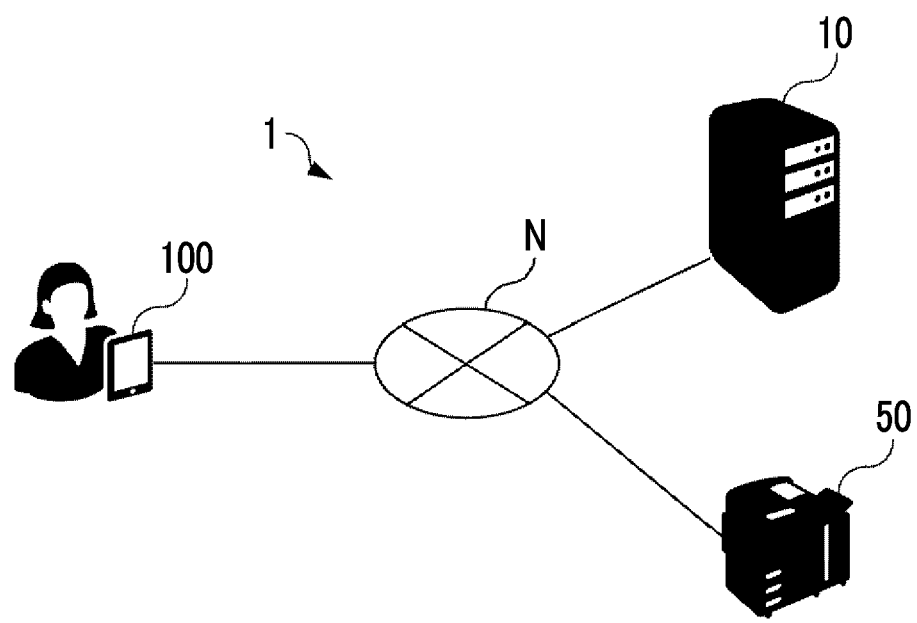
FIG. 1 is a schematic diagram illustrating an example of a configuration of an information processing system according to this exemplary embodiment.

Hereinafter, an exemplary embodiment for carrying out the invention will be described in detail with reference to the drawings. FIG. 1 is a schematic diagram illustrating an example of a configuration of an information processing system 1 according to this exemplary embodiment.

For example, as illustrated in FIG. 1, the information processing system 1 is configured to include an information processing apparatus 10 which is a server, a multifunction machine 50 having a printing function and a scanning function, and a user terminal 100 owned by a user. The information processing apparatus 10, the multifunction machine 50, and the user terminal 100 are connected to each other via a network N.

The information processing apparatus 10 is, for example, a server that is installed in a facility, such as a store, a headquarters which manages a plurality of facilities, or the like and receives print data and the designation of a facility, such as a store, in which the print data is printed from a user terminal. In a case in which the information processing apparatus 10 receives print data, the information processing apparatus 10 transmits the received print data to the multifunction machine 50 installed in the designated facility. After transmitting the print data, the information processing apparatus 10 transmits information (hereinafter, referred to as "receipt information") necessary for receiving a printed matter, on which the print data has been printed, to the multifunction machine 50 and the user terminal 100. The receipt information is information in which information for performing authentication, such as an authentication number, is represented by a Quick Response (QR) code (registered trademark). In addition, an aspect in which the receipt information according to this exemplary embodiment is a QR code (registered trademark) has been described. However, this exemplary embodiment is not limited to this aspect. The receipt information may be an authentication number.

Further, the information processing apparatus 10 acquires information (hereinafter, referred to as "user information") for identifying the user presented by the user terminal 100 from a reading device 18A, which is installed in the facility and will be described below, and authenticates the user who has entered the facility. The user information is information for identifying the user and includes, for example, the name of the user and a point of contact of the user. The user information is presented, for example, from the user terminal 100 using a QR code (registered trademark). The information processing apparatus 10 detects the position of the user in the facility using an image or a video (hereinafter, referred to as "image or the like") acquired from an imaging unit 18B, such as a camera, which is installed in the facility and will be described below and detects that the user has left the facility.

The multifunction machine 50 is an image forming apparatus that is installed in each facility. In a case in which the multifunction machine 50 receives the print data and the receipt information, the multifunction machine 50 outputs the print data to an output tray that is unlocked such that the user can receive the printed matter and stores information (hereinafter, referred to as "tray information") of the tray, to which the print data has been output, and the received receipt information in association with each other. In a case in which the receipt information is acquired from the user, the multifunction machine 50 unlocks the tray indicated by the tray information corresponding to the acquired receipt information and transmits, to the information processing apparatus 10, that the user has received the printed matter (hereinafter, referred to as "receipt notification"). Here, the receipt notification according to this exemplary embodiment includes receipt information corresponding to the received printed matter.

The user terminal 100 is a mobile terminal that is carried and operated by the user and transmits the user information, the print data, and designation of a facility for printing the print data to the information processing apparatus 10. The information processing apparatus 10 presents the user information and the receipt information for receiving the printed matter.

Figure 2:
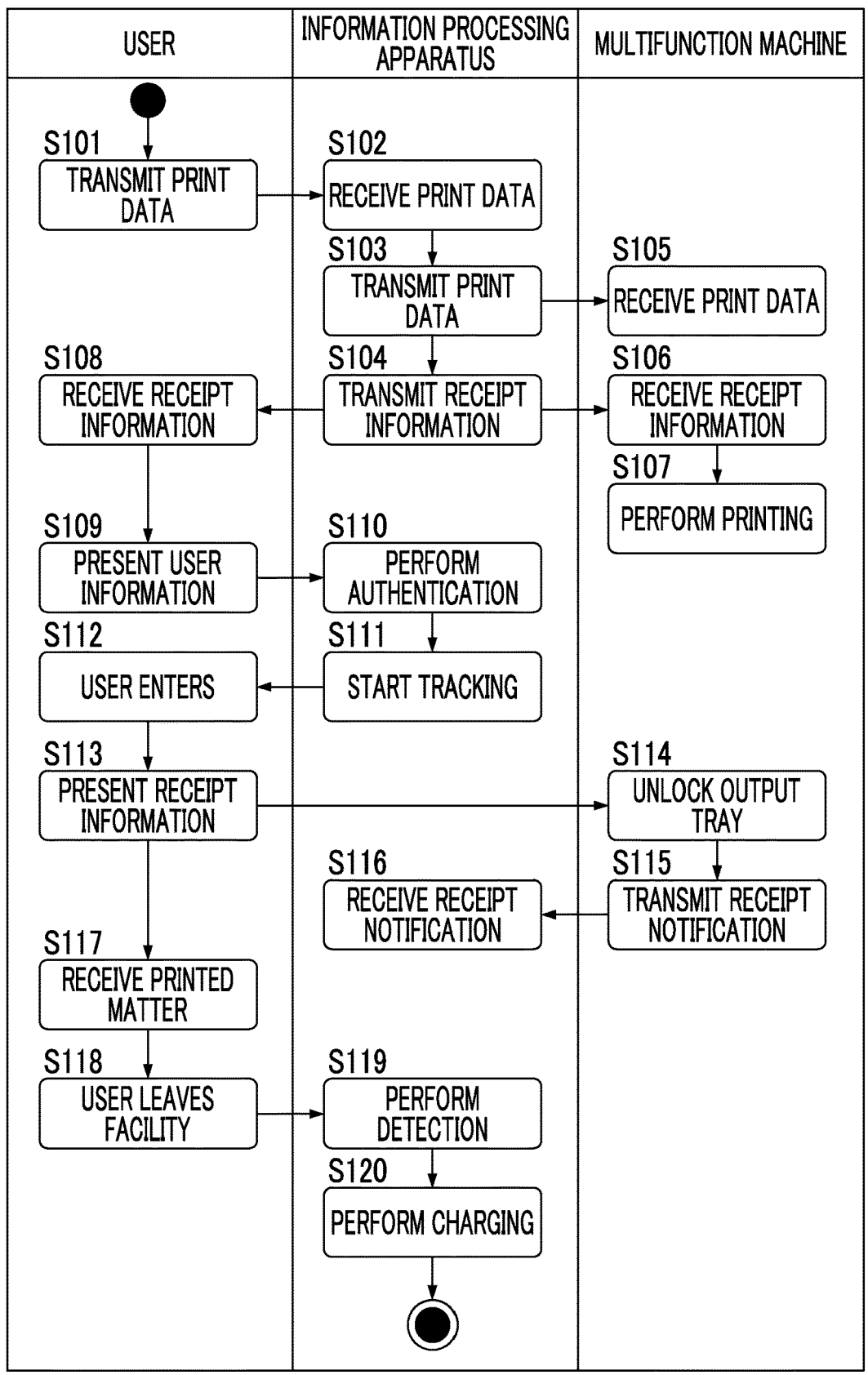
FIG. 2 is an activity diagram illustrating an example of a series of flows from transmission of print data to charging according to this exemplary embodiment.

Next, a flow from the transmission of print data to charging the user will be described with reference to FIG. 2. FIG. 2 is an activity diagram illustrating an example of a series of flows from the transmission of print data to charging the user.

For example, as illustrated in FIG. 2, the user designates a facility for printing using the user terminal 100 and transmits print data together with user information to the information processing apparatus 10 (Step S101).

The information processing apparatus 10 receives the print data together with the designation of the facility (Step S102) and transmits the print data to the multifunction machine 50 installed in the designated facility (Step S103). The information processing apparatus 10 transmits the receipt information to the multifunction machine 50 and the user terminal 100 (Step S104).

The multifunction machine 50 receives the print data (Step S105), receives the receipt information (Step S106), and then prints the print data (Step S107). Here, the multifunction machine 50 stores the information of the tray to which the printed matter has been output and the received receipt information.

The user terminal 100 receives the receipt information transmitted from the information processing apparatus 10 (Step S108). In a case in which the user visits the facility, the user presents the user information to the reading device 18A, which is installed in the facility and will be described below, using the user terminal 100 (Step S109).

The information processing apparatus 10 acquires the user information, authenticates the user (Step S110), and specifies and tracks the user, who is present in front of the reading device 18A installed in the facility, using the image or the like acquired from the imaging unit 18B which is installed in the facility and will be described below (Step S111).

The user enters the facility (Step S112) and presents the receipt information to the multifunction machine 50 installed in the facility (Step S113).

In a case in which the receipt information is acquired from the user terminal 100, the multifunction machine 50 unlocks the tray corresponding to the receipt information (Step S114). After unlocking the tray, the multifunction machine 50 transmits the receipt notification to the information processing apparatus 10 (Step S115).

The information processing apparatus 10 receives the receipt notification from the multifunction machine 50 and sets the fact that the receipt notification has been received in the user information (Step S116).

The user receives the printed matter from the multifunction machine 50 (Step S117) and leaves the facility (Step S118).

The information processing apparatus 10 detects the user who has left the facility (Step S119), confirms that the user has received the printed matter, and charges the user (Step S120).

As described above, the information processing apparatus 10 enables the user to transmit the print data in advance, to enter the facility, and to receive the printed matter immediately.

Figure 3:
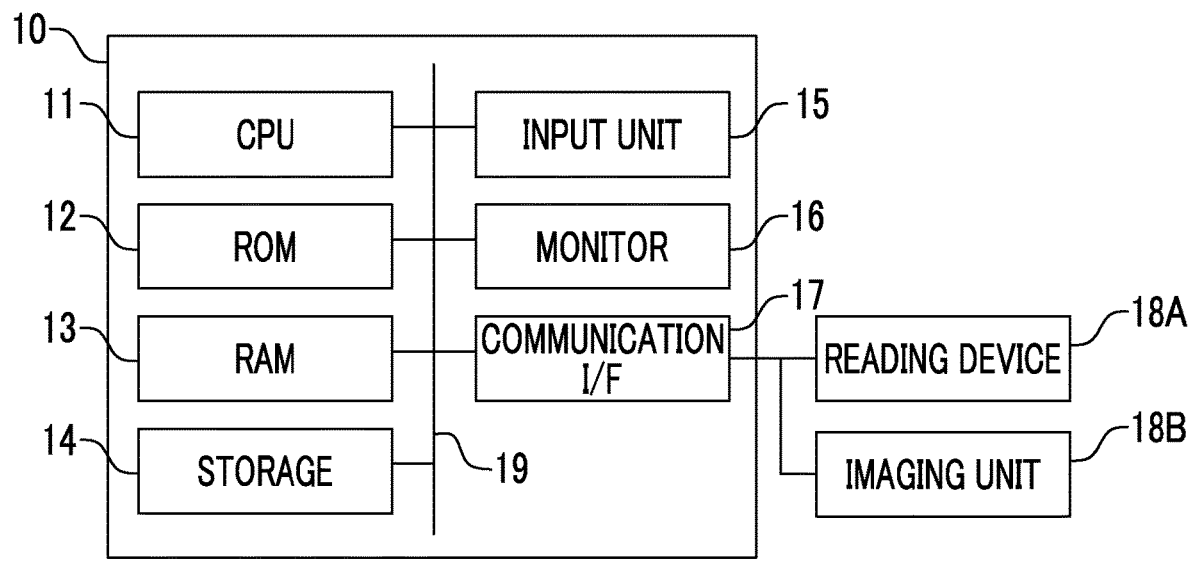
FIG. 3 is a block diagram illustrating an example of a hardware configuration of an information processing apparatus according to this exemplary embodiment.

Next, a hardware configuration of the information processing apparatus 10 will be described with reference to FIG. 3. FIG. 3 is a block diagram illustrating an example of the hardware configuration of the information processing apparatus 10 according to this exemplary embodiment.

As illustrated in FIG. 3, the information processing apparatus 10 according to this exemplary embodiment is configured to include a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and communication I/F 17 are connected to each other by a bus 19. In addition, the information processing apparatus 10 is connected to the reading device 18A and the imaging unit 18B via the communication I/F 17. Here, the CPU 11 is an example of a processor.

The CPU 11 controls the overall operation of the information processing apparatus 10. The ROM 12 stores, for example, various programs including an information processing program used in this exemplary embodiment and data. The RAM 13 is a memory that is used as a work area in a case in which various programs are executed. The CPU 11 expands the program stored in the ROM 12 into the RAM 13 and executes the program to perform user detection and a charging process.

The storage 14 is, for example, a hard disk drive (HDD), a solid state drive (SSD), or a flash memory. The storage 14 according to this exemplary embodiment includes a user information DB (database) for authenticating user information and a charge information DB indicating a charge for the printed matter. In addition, the storage 14 may store, for example, the information processing program.

The input unit 15 is a mouse, a keyboard, or the like that receives the input of text or the like. The monitor 16 displays text and images. The communication I/F 17 transmits and receives data.

The reading device 18A is a device for reading a QR code (registered trademark) installed in the facility. Further, an aspect in which the reading device 18A according to this exemplary embodiment is a QR code reader will be described. However, this exemplary embodiment is not limited to this aspect. The reading device 18A may be a device for reading an integrated circuit (IC) card or may be an input device that receives an authentication number. The imaging unit 18B is an imaging device, such as a camera, that is installed in the facility and images the user in the facility. Furthermore, as the imaging unit 18B, a plurality of imaging devices are installed in the facility in order to image the entire inside of the facility.

Figure 4:
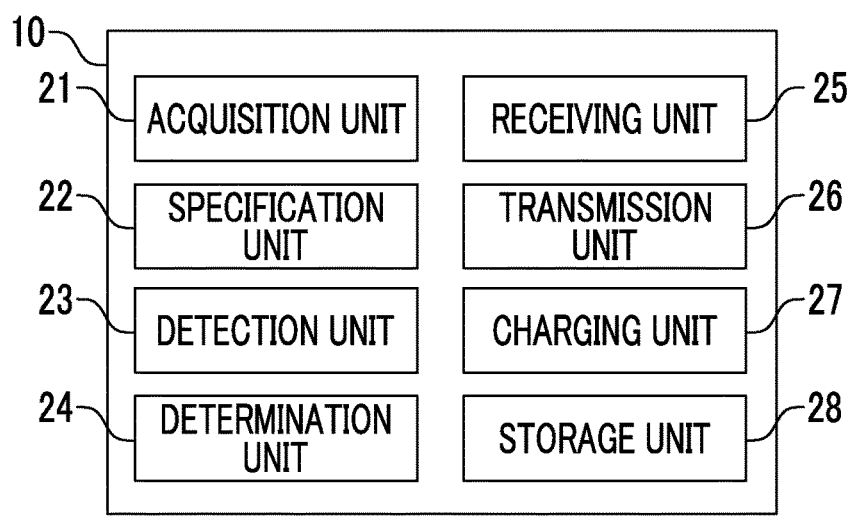
FIG. 4 is a block diagram illustrating an example of a functional configuration of the information processing apparatus according to this exemplary embodiment.

Next, a functional configuration of the information processing apparatus 10 will be described with reference to FIG. 4. FIG. 4 is a block diagram illustrating an example of the functional configuration of the information processing apparatus 10 according to this exemplary embodiment.

For example, as illustrated in FIG. 4, the information processing apparatus 10 includes an acquisition unit 21, a specification unit 22, a detection unit 23, a determination unit 24, a receiving unit 25, a transmission unit 26, a charging unit 27, and a storage unit 28. In a case in which the CPU 11 executes the information processing program to function as the acquisition unit 21, the specification unit 22, the detection unit 23, the determination unit 24, the receiving unit 25, the transmission unit 26, the charging unit 27, and the storage unit 28.

The acquisition unit 21 acquires user information from the reading device 18A. Further, the acquisition unit 21 acquires the image or the like from the imaging unit 18B.

The specification unit 22 collates the acquired user information with the user information DB that has been registered in advance and specifies and authenticates the user. In addition, the specification unit 22 specifies the user related to the user information using the acquired image or the like. For example, the specification unit 22 specifies a user located in the vicinity of the reading device 18A as the user related to the user information in a case in which the acquisition unit 21 acquires the user information. That is, the specification unit 22 specifies the user information that has been registered in advance and the user included in the image or the like in association with each other.

The detection unit 23 identifies each of the specified users and detects the position of each user using the image or the like.

The determination unit 24 determines whether or not the user has left the facility using the position of the user detected by the detection unit 23.

The receiving unit 25 receives the user information, the print data, and the designation of the facility from the user terminal 100. In addition, the receiving unit 25 receives the receipt notification from the multifunction machine 50. Further, the receiving unit 25 receives a notification (hereinafter, referred to as "a discard notification") indicating that the print data is to be discarded from the multifunction machine 50. Here, the discard notification according to this exemplary embodiment includes receipt information corresponding to the discarded printed matter.

The transmission unit 26 transmits the print data to the multifunction machine 50 installed in the designated facility. The transmission unit 26 transmits the receipt information to the multifunction machine 50 and the user terminal 100. The transmission unit 26 transmits a receipt forgetting notification in a case in which the user leaves the facility without receiving the printed matter or in a case in which the printed matter is not received within a predetermined period after the reception of the printed data. In a case in which the charging unit 27, which will be described below, performs charging, the transmission unit 26 transmits, to the user terminal 100, information indicating that charging has been performed and a charge (hereinafter, referred to as "charging notification").

The charging unit 27 controls charging the user. Specifically, the charging unit 27 sets a provisional charging flag, a receipt flag, a reception date and time, an entrance date and time, and an exit date and time in the user information to control charging the user.

For example, the charging unit 27 sets the provisional charging flag and the reception date and time in the user information in a case in which the user information and the print data are received and sets the receipt flag in a case in which the receipt notification is received. In addition, the charging unit 27 sets the entrance date and time in a case in which the entrance of the user is detected and sets the exit date and time in the user information in a case in which the exit of the user is detected. The charging unit 27 stores the charge in association with the user information, in which the receipt flag and the exit date and time have been set, and charges the user. Here, the charging unit 27 collates, for example, the amount of printing related to the print data and the settings related to printing with the charge information DB and derives the charge.

In a case in which the discard notification is received before the exit of the user is detected, the charging unit 27 cancels the provisional charging flag and does not charge the user. In a case in which the receipt flag is not set in the user information and the exit date and time is set in the user information, the charging unit 27 transmits information indicating that the user has forgotten to receive the printed matter (hereinafter, referred to as "a receipt forgetting notification").

Figure 5:
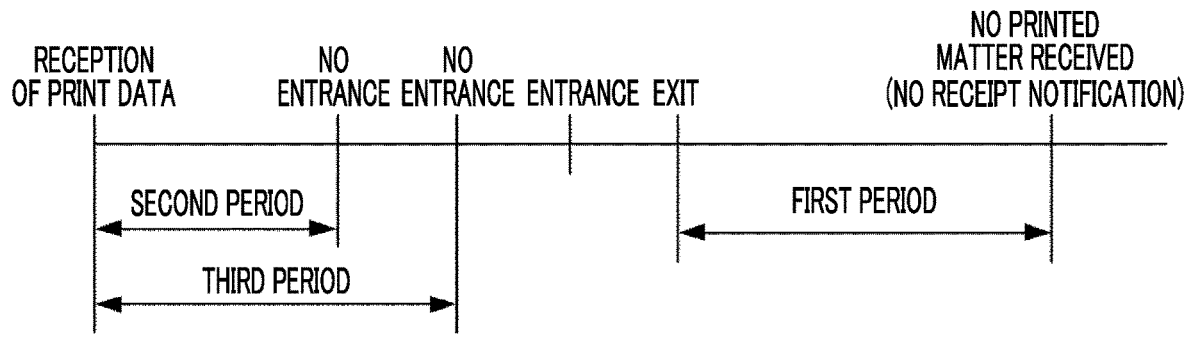
FIG. 5 is a schematic diagram illustrating an example of a time series used for describing detection of forgetting of reception according to this exemplary embodiment.

Further, as illustrated in FIG. 5, in a case in which printed matter is not received until a predetermined first period elapses from the exit (exit date and time) (the receipt flag is not set), the charging unit 27 charges the user. In a case in which the entrance of the user is not detected (the entrance date and time is not set) until a predetermined second period elapses from the reception of the print data (reception date and time), the charging unit 27 transmits the receipt forgetting notification. In a case in which the entrance of the user is not detected (the entrance date and time is not set) until a predetermined third period elapses from the reception of the print data (reception date and time), the charging unit 27 charges the user. In addition, the third period according to this exemplary embodiment is longer than the second period. However, this exemplary embodiment is not limited to this aspect. The third period may be shorter than the second period.

The storage unit 28 stores the provisional charging flag, the receipt flag, the reception date and time, the entrance date and time, the exit date and time, the charge, and the receipt information in association with the corresponding user information.

Figure 6:
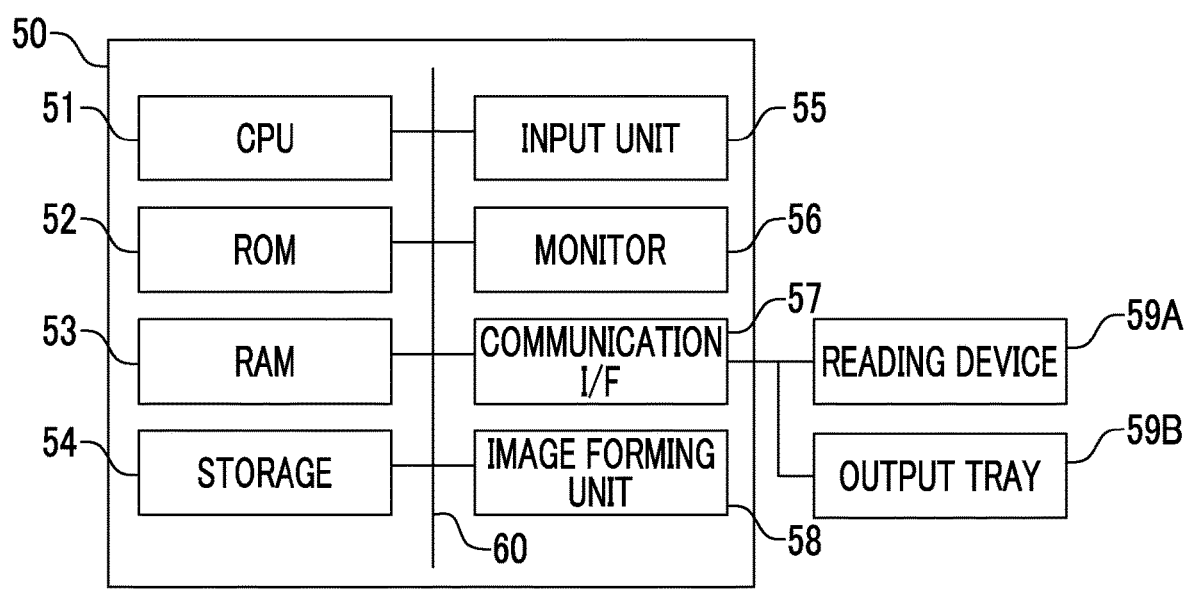
FIG. 6 is a block diagram illustrating an example of a hardware configuration of a multifunction machine according to this exemplary embodiment.

Next, a hardware configuration of the multifunction machine 50 will be described with reference to FIG. 6. FIG. 6 is a block diagram illustrating an example of the hardware configuration of the multifunction machine 50 according to this exemplary embodiment.

The multifunction machine 50 according to this exemplary embodiment is configured to include a CPU 51, a ROM 52, a RAM 53, a storage 54, an input unit 55, a monitor 56, a communication I/F 57, and an image forming unit 58. The CPU 51, the ROM 52, the RAM 53, the storage 54, the input unit 55, the monitor 56, the communication I/F 57, and the image forming unit 58 are connected to each other by a bus 60. Further, the multifunction machine 50 is connected to a reading device 59A and an output tray 59B via a communication I/F 57.

In addition, since the ROM 52, the RAM 53, the storage 54, the input unit 55, the monitor 56, and the communication I/F 57 related to the multifunction machine 50 illustrated in FIG. 6 are identical to the ROM 12, the RAM 13, the storage 14, the input unit 15, the monitor 16, and the communication I/F 17, respectively, the description thereof will not be repeated.

The CPU 51 controls the overall operation of the multifunction machine 50. The CPU 51 expands a program stored in the ROM 52 into the RAM 53 and executes the program to perform a printing process of printing print data.

The image forming unit 58 is a device having functions including a printing function of outputting an image to a recording medium using print data and a scanner function of reading the image recorded on the recording medium and outputting the image as image data.

The reading device 59A is a device that is installed in the facility to read a QR code (registered trademark). Further, an aspect in which the reading device 18A according to this exemplary embodiment is a QR code reader will be described. However, this exemplary embodiment is not limited to this aspect. The reading device 18A may be a device for reading an integrated circuit (IC) card or may be an input device that receives an authentication number.

The output tray 59B is a tray for accommodating the printed matter output from the image forming unit 58. The output tray 59B according to this exemplary embodiment is unlocked such that the printed matter can be taken out. For example, the multifunction machine 50 stores in advance information (hereinafter, referred to as "tray information") indicating the tray to which the printed matter has been output and the receipt information in association with each other. In a case in which the receipt information is acquired from the reading device 59A, the multifunction machine 50 collates the acquired receipt information with the stored receipt information and unlocks the tray according to the tray information corresponding to the receipt information.

Figure 7:
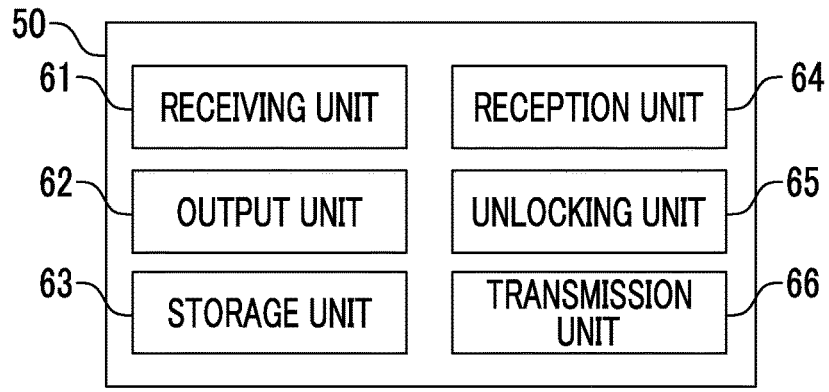
FIG. 7 is a block diagram illustrating an example of a functional configuration of the multifunction machine according to this exemplary embodiment.

Next, a functional configuration of the multifunction machine 50 will be described with reference to FIG. 7. FIG. 7 is a block diagram illustrating an example of the functional configuration of the multifunction machine 50 according to this exemplary embodiment.

For example, as illustrated in FIG. 7, the multifunction machine 50 includes a receiving unit 61, an output unit 62, a storage unit 63, a reception unit 64, an unlocking unit 65, and a transmission unit 66. In a case in which the CPU 51 executes the printing processing program to function as the receiving unit 61, the output unit 62, the storage unit 63, the reception unit 64, the unlocking unit 65, and the transmission unit 66.

The receiving unit 61 receives the print data and the receipt information from the information processing apparatus 10.

In a case in which the print data is received, the output unit 62 outputs a printed matter.

The storage unit 63 stores the tray information indicating the tray to which the printed matter has been output and the received receipt information in association with each other.

The reception unit 64 receives the receipt information from the user terminal 100 via the reading device 59A. In addition, the reception unit 64 receives an instruction to discard the print data.

In a case in which the receipt information is received, the unlocking unit 65 collates the received receipt information with the stored receipt information. In a case in which the received receipt information has been stored, the unlocking unit 65 unlocks the corresponding tray according to the tray information associated with the receipt information.

In a case in which the tray is unlocked and the printed matter is received, the transmission unit 66 transmits the receipt notification to the information processing apparatus 10. Further, in a case in which the instruction to discard the print data is received, the transmission unit 66 transmits the discard notification to the information processing apparatus 10.

Figure 8:
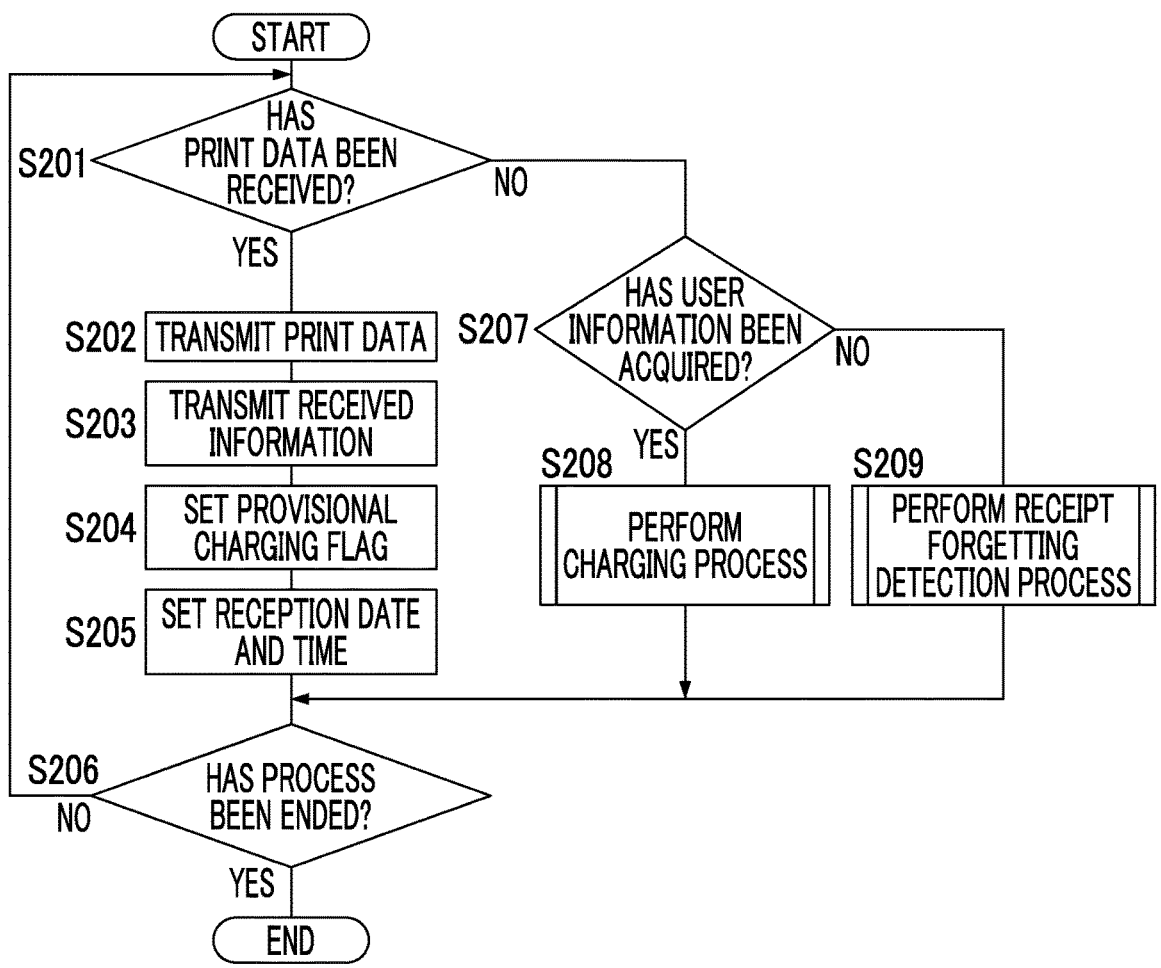
FIG. 8 is a flowchart illustrating an example of a flow of information processing according to this exemplary embodiment.
Figure 9:
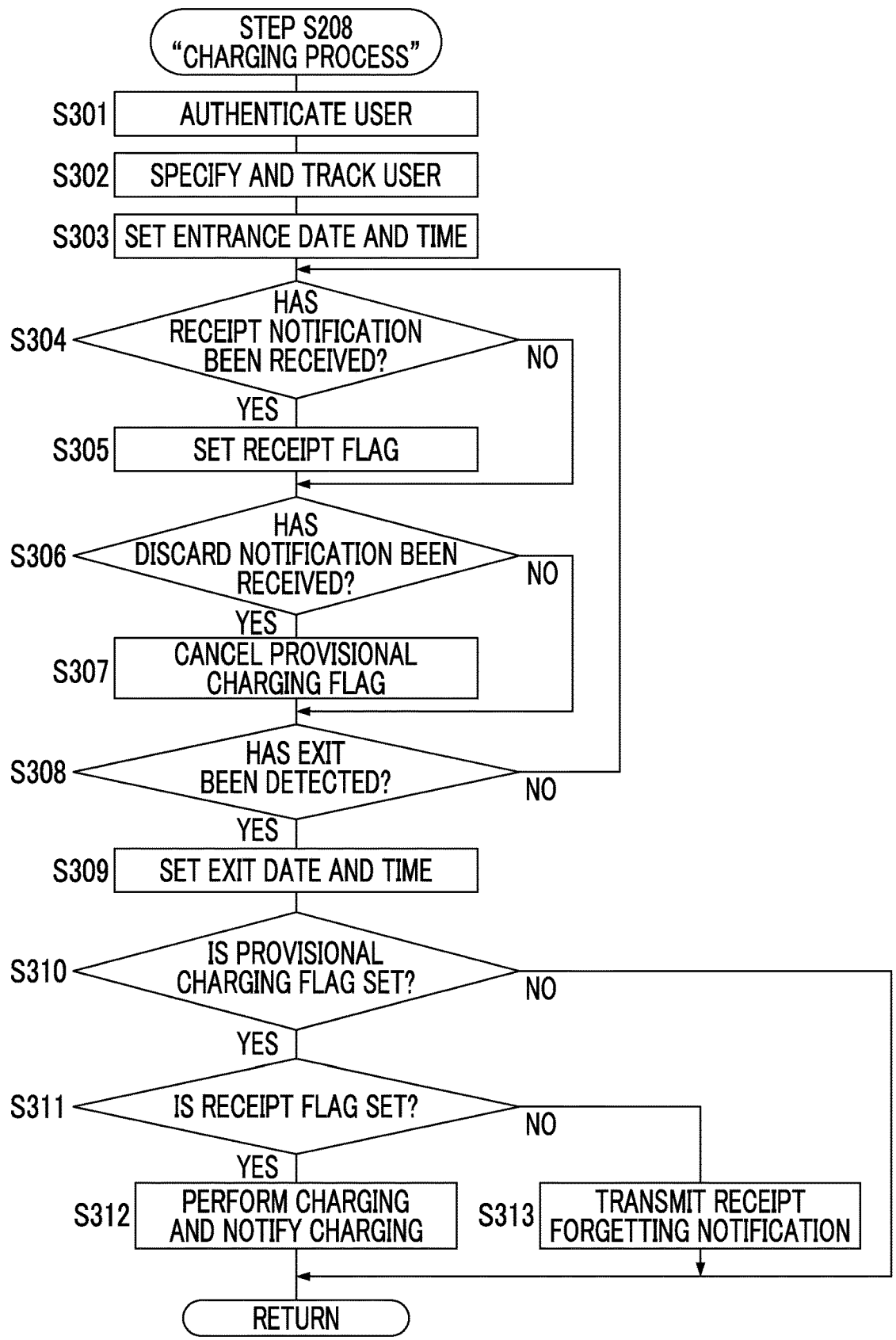
FIG. 9 is a flowchart illustrating an example of a flow of a charging process according to this exemplary embodiment.
Figure 10:
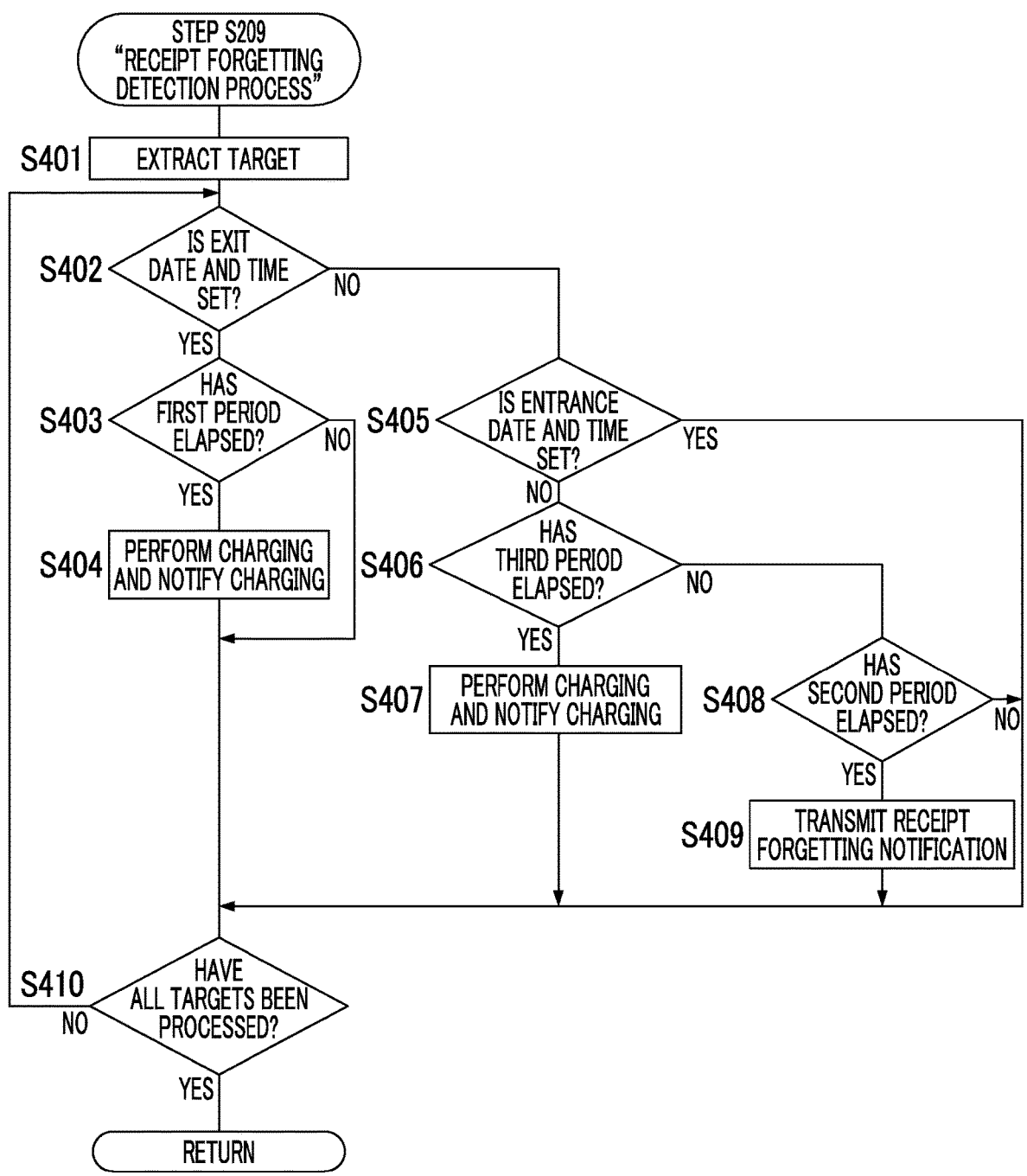
FIG. 10 is a flowchart illustrating an example of a flow of a receipt forgetting detection process according to this exemplary embodiment.

Next, the operation of the information processing apparatus 10 according to this exemplary embodiment will be described with reference to FIGS. 8 to 10. FIG. 8 is a flowchart illustrating an example of a process of detecting a user and charging the user according to this exemplary embodiment. The CPU 11 reads the information processing program from the ROM 12 or the storage 14 and executes the information processing program to perform information processing illustrated in FIG. 8. The information processing illustrated in FIG. 8 is performed, for example, in a case in which an instruction to perform the information processing is input.

In Step S201, the CPU 11 determines whether or not print data has been received from the user terminal 100. In a case in which the print data has been received (Step S201: YES), the CPU 11 proceeds to Step S202. On the other hand, in a case in which the print data has not been received (Step S201: NO), the CPU 11 proceeds to Step S207.

In Step S202, the CPU 11 transmits the received print data to the multifunction machine 50 installed in the designated facility.

In Step S203, the CPU 11 transmits the receipt information to the multifunction machine 50 and the user terminal 100. Here, the user information and the receipt information are stored in association with each other.

In Step S204, the CPU 11 sets the provisional charging flag in the user information indicating the user terminal 100 (user) that has transmitted the print data and stores the user information.

In Step S205, the CPU 11 sets the reception date and time when the print data was received in the user information and stores the user information.

In Step S206, the CPU 11 determines whether or not to end the process. In a case in which the process is ended (Step S206: YES), the CPU 11 ends the process. On the other hand, in a case in which the process is not ended (Step S206: NO), the CPU 11 proceeds to Step S201.

In Step S207, the CPU 11 determines whether or not the user information has been acquired from the reading device 18A. In a case in which the user information has been acquired (Step S207: YES), the CPU 11 proceeds to Step S208. On the other hand, in a case in which the user information has not been acquired (Step S207: NO), the CPU 11 proceeds to Step S209.

In Step S208, the CPU 11 performs a charging process. In addition, the charging process will be described in detail with reference to FIG. 9 which will be described below.

In Step S209, the CPU 11 performs a receipt forgetting detection process. In addition, the receipt forgetting detection process will be described in detail with reference to FIG. 10 which will be described below.

Next, the charging process according to this exemplary embodiment will be described with reference to FIG. 9. FIG. 9 is a flowchart illustrating an example of a process of charging the user according to this exemplary embodiment. The CPU 11 reads a charging processing program from the ROM 12 or the storage 14 and executes the charging processing program to perform the charging process illustrated in FIG. 9. The charging process illustrated in FIG. 9 is performed, for example, in a case in which the user information is acquired and an instruction to perform the charging process is input.

In Step S301, the CPU 11 acquires the user information from the reading device 18A and collates the acquired user information with the user information stored in the user information DB to authenticate the user.

In Step S302, the CPU 11 specifies the authenticated user using the image or the like acquired from the imaging unit 18B and starts tracking the user.

In Step S303, the CPU 11 sets the entrance date and time in the user information corresponding to the authenticated user and stores the user information.

In Step S304, the CPU 11 determines whether or not the receipt notification has been received from the multifunction machine 50. In a case in which the receipt notification has been received (Step S304: YES), the CPU 11 proceeds to Step S305. On the other hand, in a case in which the receipt notification has not been received (Step S304: NO), the CPU 11 proceeds to Step S306.

In Step S305, the CPU 11 sets the receipt flag in the user information related to the receipt notification and stores the user information.

In Step S306, the CPU 11 determines whether or not the discard notification has been received from the multifunction machine 50. In a case in which the discard notification has been received (Step S306: YES), the CPU 11 proceeds to Step S307. On the other hand, in a case in which the discard notification has not been received (Step S306: NO), the CPU 11 proceeds to Step S308.

In Step S307, the CPU 11 cancels the provisional charging flag set in the user information.

In Step S308, the CPU 11 determines whether or not the exit of the user has been detected. In a case in which the exit of the user has been detected (Step S308: YES), the CPU 11 proceeds to Step S309. On the other hand, in a case in which the exit of the user has not been detected (Step S308: NO), the CPU 11 proceeds to Step S304 and determines whether or not the receipt notification has been received.

In Step S309, the CPU 11 sets the exit date and time in the user information related to the user who has exited.

In Step S310, the CPU 11 determines whether or not the provisional charging flag is set in the user information corresponding to the user who has exited. In a case in which the provisional charging flag is set (Step S310: YES), the CPU 11 proceeds to Step S311. On the other hand, in a case in which the provisional charging flag is not set (the provisional charging flag is canceled) (Step S310: NO), the CPU 11 ends the charging process.

In Step S311, the CPU 11 determines whether or not the receipt flag is set in the user information corresponding to the user who has exited. In a case in which the receipt flag is set (Step S311: YES), the CPU 11 proceeds to Step S312. On the other hand, in a case in which the receipt flag is not set (the printed matter is not received) (Step S311: NO), the CPU 11 proceeds to Step S313.

In Step S312, the CPU 11 charges the user who has exited. Here, the CPU 11 derives a charge according to the settings related to printing, such as the number of pages on which the print data is printed and color settings, stores the charge in the user information, and transmits the charging notification to the user terminal 100.

In Step S313, the CPU 11 transmits the receipt forgetting notification to the point of contact included in the user information corresponding to the user who has exited.

Next, the receipt forgetting detection process according to this exemplary embodiment will be described with reference to FIG. 10. FIG. 10 is a flowchart illustrating an example of a process for detecting receipt forgetting according to this exemplary embodiment. In a case in which the CPU 11 reads a receipt forgetting detection processing program from the ROM 12 or the storage 14 and executes the receipt forgetting detection processing program to perform the receipt forgetting detection process illustrated in FIG. 10. The receipt forgetting detection process illustrated in FIG. 10 is performed, for example, in a case in which an instruction to perform the receipt forgetting detection process is input.

In Step S401, the CPU 11 extracts user information in which the receipt flag is not set from the user information items in which the reception date and time is set as target user information to be subjected to receipt forgetting detection.

In Step S402, the CPU 11 determines whether or not the exit date and time is set in the extracted user information. In a case in which the exit date and time is set (Step S402: YES), the CPU 11 proceeds to Step S403. On the other hand, in a case in which the exit date and time is not set (Step S402: NO), the CPU 11 proceeds to Step S405.

In Step S403, the CPU 11 determines whether or not the first period has elapsed since the exit date and time when the user exited for the target user information. In a case in which the first period has elapsed since the exit date and time (Step S403: YES), the CPU 11 proceeds to Step S404. On the other hand, in a case in which the first period has not elapsed since the exit date and time (Step S403: NO), the CPU 11 proceeds to Step S410.

In Step S404, the CPU 11 charges the user related to the target user information. Here, the CPU 11 derives a charge, stores the charge in the user information, and transmits the charging notification to the user terminal 100.

In Step S405, the CPU 11 determines whether or not the entrance date and time is set in the target user information. In a case in which the entrance date and time is set (Step S405: YES), the CPU 11 proceeds to Step S410. On the other hand, in a case in which the entrance date and time is not set (Step S405: NO), the CPU 11 proceeds to Step S406.

In Step S406, the CPU 11 determines whether or not the third period has elapsed since the reception of the print data for the target user information. In a case in which the third period has elapsed since the reception of the print data (Step S406: YES), the CPU 11 proceeds to Step S407. On the other hand, in a case in which the third period has not elapsed since the reception of the print data (Step S406: NO), the CPU 11 proceeds to Step S408.

In Step S407, the CPU 11 charges the user related to the target user information. Here, the CPU 11 derives a charge, stores the charge in the user information, and transmits the charging notification to the user terminal 100.

In Step S408, the CPU 11 determines whether or not the second period has elapsed since the reception of the print data for the target user information. In a case in which the second period has elapsed since the reception of the print data (Step S408: YES), the CPU 11 proceeds to Step S409. On the other hand, in a case in which the second period has not elapsed since the reception of the print data (Step S408: NO), the CPU 11 proceeds to Step S410.

In Step S409, the CPU 11 transmits the receipt forgetting notification to the point of contact included in the target user information.

In Step S410, the CPU 11 determines whether or not all of the extracted target user information has been processed. In a case in which all of the extracted target user information has been processed (Step S410: YES), the CPU 11 ends the receipt forgetting detection process. On the other hand, in a case in which all of the extracted target user information has not been processed (there is an unprocessed target among the extracted targets) (Step S410: NO), the CPU 11 proceeds to Step S402, acquires the next target user information, and determines whether or not the exit date and time is set in the target user information.

Figure 11:
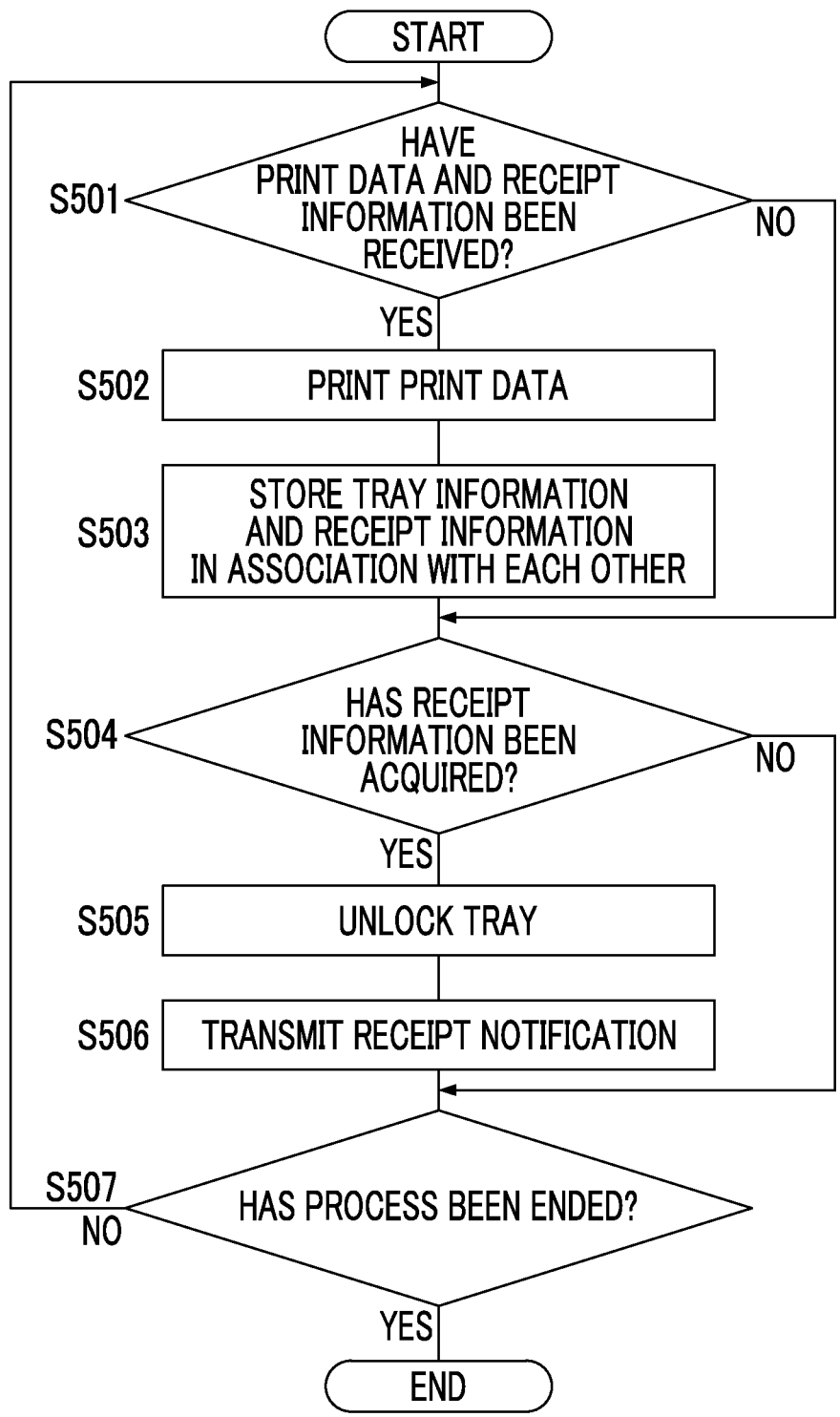
FIG. 11 is a flowchart illustrating an example of a flow of a printing process according to this exemplary embodiment.

Next, the operation of the multifunction machine 50 according to this exemplary embodiment will be described with reference to FIG. 11. FIG. 11 is a flowchart illustrating an example of a printing process according to this exemplary embodiment. In a case in which the CPU 51 reads the printing processing program from the ROM 52 or the storage 54 and executes the printing processing program to perform the printing process illustrated in FIG. 11. The printing process illustrated in FIG. 11 is performed, for example, in a case in which an instruction to perform the printing process is input.

In Step S501, the CPU 51 determines whether or not the print data and the receipt information have been received from the information processing apparatus 10. In a case in which the print data and the receipt information have been received (Step S501: YES), the CPU 51 proceeds to Step S502. On the other hand, in a case in which the print data and the receipt information have not been received (Step S501: NO), the CPU 51 proceeds to Step S504.

In Step S502, the CPU 51 prints the print data and outputs a printed matter to the output tray 59B.

In Step S503, the CPU 51 stores the tray information and the receipt information in association with each other.

In Step S504, the CPU 51 determines whether or not the receipt information has been acquired from the reading device 59A. In a case in which the receipt information has been acquired (Step S504: YES), the CPU 51 proceeds to Step S505. On the other hand, in a case in which the receipt information has not been acquired (Step S504: NO), the CPU 51 proceeds to Step S507.

In Step S505, the CPU 51 unlocks the tray indicated by the tray information corresponding to the acquired receipt information.

In Step S506, the CPU 51 transmits the receipt notification to the information processing apparatus 10.

In Step S507, the CPU 51 determines whether or not to end the printing process. In a case in which the printing process is ended (Step S507: YES), the CPU 51 ends the printing process. On the other hand, in a case in which the printing process is not ended (Step S507: NO), the CPU 51 proceeds to Step S501 and determines whether or not the print data and the receipt information have been received.

In addition, in the above-described exemplary embodiment, the aspect in which the user is charged in a case in which the first period has elapsed since the user left the facility has been described. However, this exemplary embodiment is not limited to this aspect. For example, in a case in which the first period has elapsed since the user left the facility, a person concerned with the facility may be notified that there is a printed matter that has been forgotten to be received. In a case in which the person concerned collects the printed matter, the user may be charged.

Further, in the above-described exemplary embodiment, the aspect in which the user is charged in a case in which the third period has elapsed since the transmission of the print data has been described. However, this exemplary embodiment is not limited to this aspect. For example, in a case in which the third period has elapsed since the transmission of the print data, the person concerned with the facility may be notified that there is a printed matter that has been forgotten to be received. In a case in which the person concerned collects the printed matter, the user may be charged.

Furthermore, in the above-described exemplary embodiment, the aspect has been described in which, in a case in which there is a problem with the printed matter, the multifunction machine 50 notifies the information processing apparatus 10 that the print data is to be discarded and the user is not charged. However, this exemplary embodiment is not limited to this aspect. For example, in a case in which there is a problem with the printed matter, the print data may be reprinted.

Moreover, in the above-described exemplary embodiment, the aspect in which the first period, the second period, and the third period are predetermined has been described. However, this exemplary embodiment is not limited to this aspect. The information processing apparatus 10 may receive changes in the first period, the second period, and the third period and set the periods, or the first period, the second period, and the third period may be selected by the user. In addition, the time until the user receives the printed matter may be recorded and set according to the mean, median, or maximum value of the time or may be set for each user.

Further, in the above-described exemplary embodiment, the aspect in which the multifunction machine 50 transmits the receipt notification to the information processing apparatus 10 has been described. However, this exemplary embodiment is not limited to this aspect. The receipt notification may be notified to the user terminal 100. For example, the multifunction machine 50 may transmit the receipt notification to the user terminal 100, or the information processing apparatus 10 that has received the receipt notification may transmit the receipt notification to the user terminal 100.

The invention has been described above using each exemplary embodiment. However, the invention is not limited to the scope described in each exemplary embodiment. Various modifications or improvements of each exemplary embodiment can be made without departing from the gist of the invention, and the modified or improved exemplary embodiments are also included in the technical scope of the invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, in this exemplary embodiment, the aspect in which the information processing program is installed in the storage has been described. However, the invention is not limited to this aspect. The information processing program according to this exemplary embodiment may be recorded on a non-transitory computer readable storage medium and then provided. For example, the information processing program according to the exemplary embodiment of the invention may be recorded on an optical disk, such as a compact disc (CD)-ROM or a digital versatile disc (DVD)-ROM, and then provided. The information processing program according to the exemplary embodiment of the invention may be recorded on a semiconductor memory, such as a universal serial bus (USB) memory or a memory card, and then provided. Further, the information processing program according to this exemplary embodiment may be acquired from an external device via a communication line connected to the communication I/F.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive print data and designation of a facility selected by a user from a user terminal operated by the user;
transmit the print data to an apparatus that is installed in the designated facility, transmit receipt information, which is information that enables reception of a printed matter related to the print data, to the user terminal;
charge the user for the printed matter in a case in which the user who has entered the facility receives the printed matter using the receipt information and leaves the facility; and
not to charge the user in a case in which an instruction to discard the printed matter is received before the user leaves the facility.

2. The information processing apparatus according to claim 1, wherein the processor is configured to:
receive the instruction from the apparatus.

3. The information processing apparatus according to claim 2, wherein the processor is configured to:
transmit information indicating that the printed matter has not been received to the user terminal in a case in which the user leaves the facility before the printed matter is received.

4. The information processing apparatus according to claim 3, wherein the processor is configured to:
charge the user in a case in which a predetermined first period has elapsed since the user left the facility before the printed matter is received.

5. The information processing apparatus according to claim 2, wherein the processor is configured to:
notify that the user has forgotten to take the printed matter in a case in which a predetermined second period has elapsed since the reception of the print data before the user enters the facility.

6. The information processing apparatus according to claim 1, wherein the processor is configured to:
transmit information indicating that the printed matter has not been received to the user terminal in a case in which the user leaves the facility before the printed matter is received.

7. The information processing apparatus according to claim 6, wherein the processor is configured to:
charge the user in a case in which a predetermined first period has elapsed since the user left the facility before the printed matter is received.

8. The information processing apparatus according to claim 6, wherein the processor is configured to:

notify that the user has forgotten to take the printed matter in a case in which a predetermined second period has elapsed since the reception of the print data before the user enters the facility.

9. The information processing apparatus according to claim 1, wherein the processor is configured to:
   notify that the user has forgotten to take the printed matter in a case in which a predetermined second period has elapsed since the reception of the print data before the user enters the facility.

10. The information processing apparatus according to claim 9, wherein the processor is configured to:
    charge the user in a case in which a predetermined third period longer than the second period has elapsed before the user enters the facility.

11. An information processing system comprising:
    the information processing apparatus according to claim 1; and
    an apparatus that prints the print data,
    wherein the apparatus outputs the printed matter to an output tray that is unlocked using the receipt information such that the printed matter is capable of being received.

12. The information processing system according to claim 11,
    wherein the information processing apparatus transmits the receipt information to the user terminal and the apparatus, and
    the apparatus acquires receipt information from the user and unlocks the output tray in a case in which the received receipt information corresponds to the acquired receipt information.

13. The information processing system according to claim 12,
    wherein, in a case in which the unlocking of the output tray is detected, the apparatus transmits information indicating that the printed matter has been received to the information processing apparatus.

14. A non-transitory computer readable medium storing an information processing program that causes a computer to execute a process comprising:
    receiving print data and designation of a facility selected by a user from a user terminal operated by the user;
    transmitting the print data to an apparatus that is installed in the designated facility and transmitting receipt information, which is information that enables reception of a printed matter related to the print data, to the user terminal;
    charging the user for the printed matter in a case in which the user who has entered the facility receives the printed matter using the receipt information and leaves the facility; and
    not charging the user in a case in which an instruction to discard the printed matter is received before the user leaves the facility.

15. An information processing method comprising:
    receiving print data and designation of a facility selected by a user from a user terminal operated by the user;
    transmitting the print data to an apparatus that is installed in the designated facility and transmitting receipt information, which is information that enables reception of a printed matter related to the print data, to the user terminal;
    charging the user for the printed matter in a case in which the user who has entered the facility receives the printed matter using the receipt information and leaves the facility; and
    not charging the user in a case in which an instruction to discard the printed matter is received before the user leaves the facility.

\* \* \* \* \*